(12) United States Patent
Dickerson et al.

(10) Patent No.: US 9,910,504 B2
(45) Date of Patent: Mar. 6, 2018

(54) SENSOR BASED UI IN HMD INCORPORATING LIGHT TURNING ELEMENT

(71) Applicant: Samsung Electronics Co., Ltd., Suwon-si, Gyeonggi-do (KR)

(72) Inventors: Andrew J. Dickerson, Allen, TX (US); James E. Van Den Heuvel, McKinney, TX (US); Sophie J. Kim, Houston, TX (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 346 days.

(21) Appl. No.: 14/465,810

(22) Filed: Aug. 21, 2014

(65) Prior Publication Data
US 2016/0054802 A1 Feb. 25, 2016

(51) Int. Cl.
*G06F 3/033* (2013.01)
*G06F 3/01* (2006.01)
*G02B 27/01* (2006.01)
*G06F 3/0487* (2013.01)
*G06F 3/0488* (2013.01)

(52) U.S. Cl.
CPC .......... *G06F 3/017* (2013.01); *G02B 27/017* (2013.01); *G06F 3/0487* (2013.01); *G06F 3/0488* (2013.01); *G02B 2027/014* (2013.01); *G02B 2027/0165* (2013.01); *G02B 2027/0187* (2013.01); *G06F 2203/04108* (2013.01)

(58) Field of Classification Search
CPC ...... G06F 3/017; G06F 3/0346; G06F 3/0325; G06F 3/0488; G06F 3/0487; G06F 2203/04108; G02B 27/017; G02B 2027/0187; G02B 2027/014; G02B 2027/0165

See application file for complete search history.

(56) References Cited

U.S. PATENT DOCUMENTS

| 2010/0079356 | A1* | 4/2010 | Hoellwarth | G02B 27/017 345/8 |
| 2011/0109971 | A1* | 5/2011 | Beach | G02B 13/0055 359/618 |
| 2012/0026298 | A1* | 2/2012 | Filo | G03B 35/10 348/49 |
| 2014/0361988 | A1* | 12/2014 | Katz | G06F 3/011 345/156 |

\* cited by examiner

*Primary Examiner* — Matthew Sim

(57) ABSTRACT

A head-mounted display (HMD) system includes a head-mounted frame that encases a portable electronic device (PED) that includes a touch-less sensor, and the PED. The frame includes: a front slot to hold the PED and maintain contact with the PED's display face; an entry via dimensioned to prevent blockage of the sensor's field of view; and a light turning element positioned to redirect the sensor's field of view through an exit via in the frame and into open space outside of the frame. The PED includes: the sensor to detect a touch-less gesture; an image display to display image content on the PED's front display face; and processing circuitry configured to change modes from handheld mode to HMD operation mode based on a determination that the PED is encased by the frame and to select the image content based on input signals received from the sensor and the mode.

20 Claims, 5 Drawing Sheets

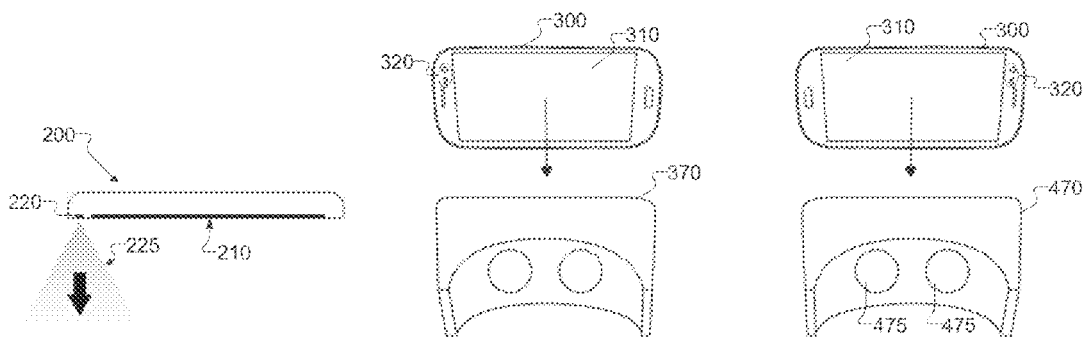
FIGURE 2A  FIGURE 3A  FIGURE 4A
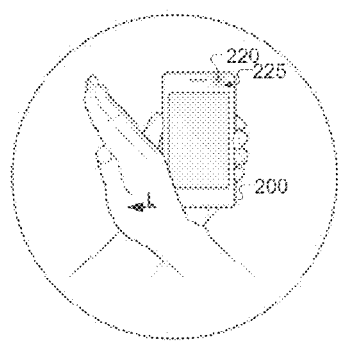 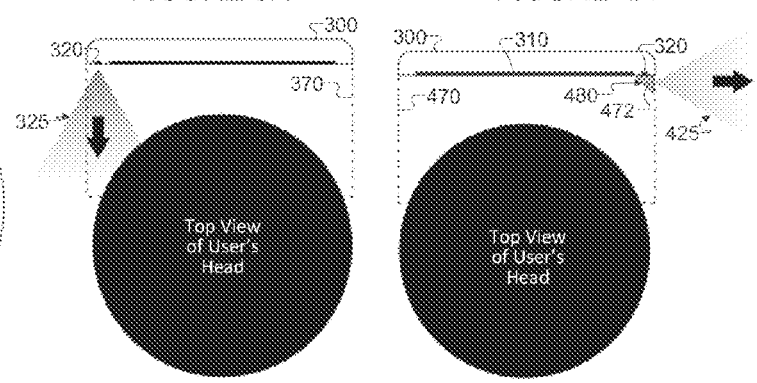
FIGURE 2B  FIGURE 3B  FIGURE 4B

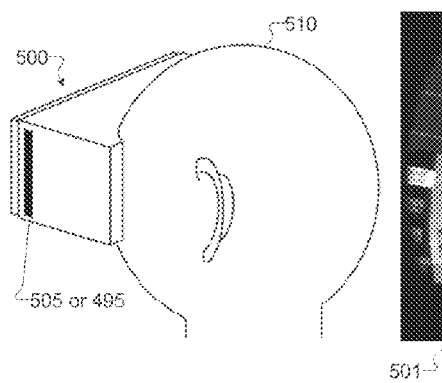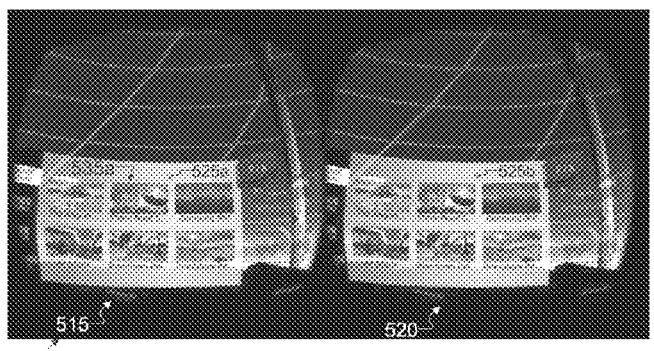
FIGURE 5A
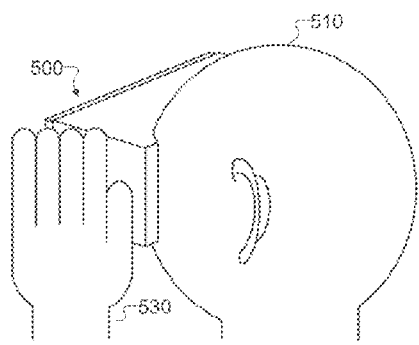
FIGURE 5B – Hatched Clicked

SENSOR BASED UI IN HMD INCORPORATING LIGHT TURNING ELEMENT

TECHNICAL FIELD

The present application relates generally to a sensor based user interface and, more specifically, to a sensor based user interface in a head-mounted device incorporating a light turning element.

BACKGROUND

Portable electronic devices such as smartphones and tablets detect and translate input of various modes using various sensors in addition to touch gestures on a touch-screen. Examples of the various input modes include: gestures, Air Gesture motions, changes in device orientation, proximity of an external object, and so forth. Examples of the various sensors include: an infrared camera, capacitive proximity sensor, ambient light sensor, and so forth. Some of these input modes become either completely inaccessible or not easily interacted with when the portable electronic device is coupled to and carried by a head-mounted apparatus for near-eye viewing. As sensors that are on the screen side ("front") of the portable electronic device get enclosed by the apparatus, the fields of view of the sensors become difficult to access.

SUMMARY

In a first embodiment, a system capable of implementing a sensor based user interface in a head-mounted display incorporating a light turning element is provided. The head-mounted display (HMD) system includes a head-mounted frame configured to receive and encase a portable electronic device (PED) that includes a touch-less sensor, and the PED. The frame includes a front slot configured to hold the PED and maintain contact with the display face of the PED. The frame includes an entry via dimensioned to prevent blockage of the sensor's field of view. The frame also includes a light turning element positioned to redirect the sensor's field of view through an exit via in the head-mounted frame and into open space outside of the head-mounted frame. The PED includes the touch-less sensor configured to detect a touch-less gesture. The PED includes an image display configured to display image content on a front display face of the PED. The PED also includes processing circuitry configured to change modes from a handheld mode to a head-mounted display (HMD) operation mode based on a determination that the PED is encased by the frame. The processing circuitry is also configured to select the image content based on input signals received from the sensor and the mode.

In a second embodiment, an apparatus for implementing a sensor based user interface in a head-mounted display incorporating a light turning element is provided. The apparatus includes a head-mounted frame configured to receive a portable electronic device (PED) that includes a touch-less sensor. The head-mounted frame includes: a front slot configured to hold the PED and maintain contact with the display face of the PED; an entry via dimensioned to prevent blockage of the sensor's field of view; and a light turning element positioned to redirect the sensor's field of view through an exit via in the head-mounted frame and into open space outside of the head-mounted frame.

In third embodiment, a non-transitory computer readable medium embodying a computer program for implementing a sensor based user interface in a head-mounted display incorporating a light turning element is provided. The non-transitory computer readable medium embodies a computer program. The computer program includes computer readable program code that, when executed by processing circuitry, causes the processing circuitry to perform processes. The computer readable program code causes the processing circuitry to: in response determining that a portable electronic device (PED) is encased by a head-mounted frame, change from a handheld mode to a head-mounted display (HMD) operation mode. The computer readable program code causes the processing circuitry to: receive input signals from a non-touch sensor of the PED. Each non-touch sensor is configured to output the input signals in response to detecting a non-touch gesture in the sensor's field of view. The non-touch gesture indicates a user selection. The gesture indicates a different user selection when the PED is in the handheld mode than when the PED is in the HMD operation mode. The computer readable program code causes the processing circuitry to: select image content based on the received input signals. The computer readable program code causes the processing circuitry to: binocularly render the selected image content to left screen and right screen portions of a bifurcated image display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a field of view of a sensor within a PED according to embodiments of the present disclosure;

FIG. 2B illustrates a hand gesture including a movement of a hand across the field of view of the sensor within the PED of FIG. 2A according to embodiments of the present disclosure;

FIG. 3A illustrates a PED being coupled to a head-mounted frame according to the present disclosure;

FIG. 3B illustrates a field of view of a sensor obstructed by a user's head and the head-mounted frame of FIG. 3A.

FIG. 4A illustrates a head-mounted display system according to embodiments of the present disclosure;

FIG. 4B illustrates a sensor's field of view free from obstruction and turned away from the user's head by a light turning element within the head-mounted display system of FIG. 4A;

FIG. 5A illustrates an example of a head-mounted display and screen in an unclicked state according to embodiments of the present disclosure;

FIG. 5B illustrates an example of a head-mounted display and screen in a clicked state according to embodiments of the present disclosure.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged head-mounted display system.

Embodiments of the present disclosure provide a method and apparatus for controlling the fields of view of various sensors embedded in a portable electronic device, making it possible to take advantage of those sensors even in a head-mounted display (HMD) setting.

Embodiments, of this disclosure incorporate a system into an HMD. The system consists of a head-mounted frame, a separate portable electronic device (PED), such as a SAMSUNG GALAXY S4, in which a group of sensors (for example, a front facing camera, a proximity sensor, an infrared (IR) sensor, and a light sensor) is embedded, and a light turning element. The system is arranged such that the light turning element redirects the signal emitted and received by the sensors of the PED, and hence redirects the fields of view of those sensors. By redirecting the sensors' fields of view, the sensors embedded in the PED become clear of obstruction and can be utilized in an HMD configuration that the original design of the PED was not intended, while the PED itself remains unmodified. The PED provides a user interface (UI) such that the user can control the actions of the PED using hand motions and the like detected by the redirected sensor signals and without removing the PED from the HMD's head-mounted frame.

Figure 1A:
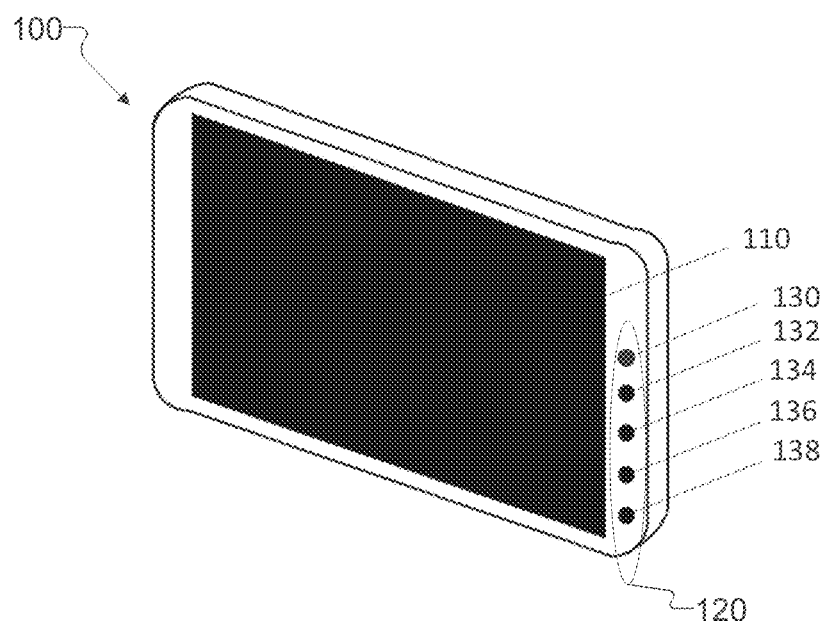
FIGS. 1A and 1B illustrate a portable electronic device (PED) including a sensor group according to embodiments of the present disclosure.
Figure 1B:
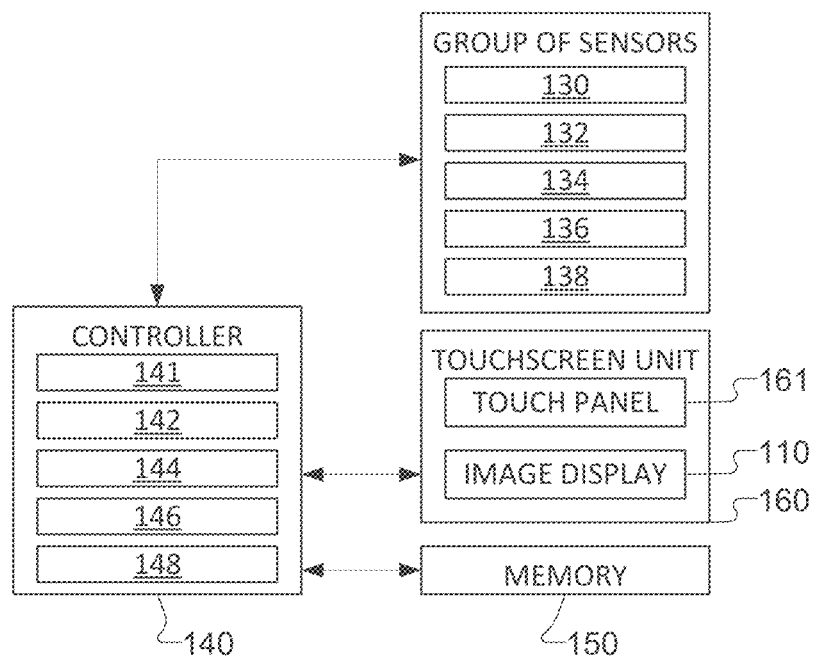

FIGS. 1A and 1B illustrate a portable electronic device (PED) including a sensor group according to embodiments of the present disclosure. The embodiment of the PED shown in FIGS. 1A and 1B is for illustration only. Other embodiments could be used without departing from the scope of the present disclosure.

The PED 100 can be a handheld electronic device, a portable media player, a smartphone, a tablet, or other user equipment. The portable electronic device 100 includes an image display 110 for viewing image based content; and one or more sensors for detecting input of various modes.

In the example shown, the sensors are grouped together and disposed in a compact area within the body of the PED 100. The group 120 of sensors is disposed within a frame of the image display, at the top right-hand corner of the front face of the PED 100. The group 120 of sensors includes a depth perception camera 130, a light sensor 132, a proximity sensor 134, an Infrared (IR) sensor 136, and a camera sensor 138. The group 120 of sensors is embedded in the PED 100. In certain embodiments, the one or more sensors are arranged in a array. In certain embodiments, the PED includes multiple groups of sensors, such as a one group of sensors at the top-right hand corner of the front face of the PED and another group of sensors at the bottom right-hand corner of the front face of the PED. The PED can include other sensors, such as an accelerometer, gyroscope, geomagnetic sensor, magnetometer, temperature sensor, a humidity sensor, a Hall sensor, barometer, and others.

The depth perception camera 130 determines which objects are in the foreground and background. The depth perception camera determines a distance to an object relative to the sensor.

The light sensor 132 detects the presence of light and generates electric signal indicating the presence of detectable light. The light sensor 132 can include an ambient light sensor. An ambient light sensor detects the amount of light and generates a signal indicating the intensity of the detected light. The light sensor 132 can include an RGB light sensor that measures the red, green, blue, and white light intensities of a light source.

The proximity sensor 134 detects the presence of nearby objects without any physical contact. A proximity sensor 134 detects whether an object, such as the user's hand or head is located near the sensor.

IR sensor 136 detects movement of an object, such as a user's hand. The IR sensor 136 emits IR rays that reflect off the user's hand and detects the reflected rays. The IR sensor 136 can include an IR gesture sensor. The gesture sensor allows users to accept a call, change songs, or scroll a web page by a wave of the user's hand.

The camera sensor 138 can include a front facing camera. The camera sensor 138 includes face recognition capabilities. In certain embodiments, the camera sensor 138 detects whether the user is holding up one, two, or three fingers.

FIG. 1B shows a block diagram of the PED 100. Although certain details will be provided with reference to the components of the PED 100, other embodiments may include more, less, or different components.

The PED 100 includes a controller 140, a memory 150, a touchscreen unit 160, and a group 120 of sensors.

The controller 140 receives information from and sends control signals to the memory 150, touchscreen unit 160, and group of sensors 120 through communication links. The controller 140 includes a depth determination unit 141, an ambient light determination unit 142, proximity determination unit 144, a touch-free gesture recognition unit 146, and an image recognition unit 148. The controller 140 recognizes touch input received from the touchscreen unit 160.

The touch screen unit 160 includes a touch panel 161 and an image display 110. The touch panel 161 includes a plurality of sensors arranged to receive a user's touch input (e.g., a finger or a stylus). The touch panel 161 outputs a signal to the controller 140 indicating the received touch input. The image display 110 can include a liquid crystal display, and a light emitting diode (LED). The PED 100 generates a stereoscopic display for near-eye viewing of the image display 110. A stereoscopic display can include a binocular view. For example, the stereoscopic display can include a smaller view of the device launcher in each half of the image display 110.

FIG. 2A illustrates a field of view of a sensor within a PED according to embodiments of the present disclosure. The PED 200 includes an image display 210, a group 220 of one or more sensors, which may be similar to components 100, 110, and 120 of FIG. 1A, respectively. The embodiment of the field of view 225 of the sensor shown in FIG. 2A is for illustration only. Other embodiments could be used without departing from the scope of the present disclosure.

In the example shown in FIG. 2A, each sensor in the group of sensors 220 has a field of view 225 directly in front of the sensor. The field of view 225 increases in area with increases in distance from the sensor. That is, a sensor's field of view 225 at 8 inches from the sensor is wider and longer than the sensor's field of view 225 at 2 inches from the sensor.

FIG. 2B illustrates a hand gesture including a movement of a hand across the field of view of the sensor within the PED of FIG. 2A according to embodiments of the present disclosure. The hand moves in a linear motion in the direction of the arrow L, for example to scroll a webpage leftward or rightward. The example of the hand gesture shown in FIG. 2B is for illustration only. Other hand gestures could be used without departing from the scope of the present disclosure. The hand can move in a linear motion orthogonal to the direction of the arrow L to scroll upward or downward.

FIG. 3A shows a PED being coupled to a head-mounted frame according to the present disclosure. The PED 300 includes an image display 310, a group 320 of one or more sensors, which may be similar to components 200, 210, and 220 respectively, or similar to components 100, 110, and 120 of FIG. 1, respectively. The embodiment of the PED 300 coupling to the head-mounted frame 370 shown in FIG. 3A is for illustration only. Other embodiments could be used without departing from the scope of the present disclosure.

In the example shown in FIG. 3A, the head-mounted frame 270 includes a front slot configured to receive the PED 300. The PED 300 slides into the slot and couples to the head-mounted frame 370, forming a head-mounted display (HMD) shown in FIG. 3B.

FIG. 3B illustrates a field of view of a sensor obstructed by a user's head and the head-mounted frame of FIG. 3A. FIG. 3B shows a top view of a head-mounted display worn by a user. The example of the field of view 325 of the sensor shown in FIG. 3B is for illustration only. Other examples could be used without departing from the scope of the present disclosure.

When the PED 300 is within the head-mounted frame 370, the head-mounted frame 370 and the user's head obstructs the sensor's field of view 325. As a result of the obstruction, these sensors cannot be utilized to control the PED while the PED is used as a HMD device. For example, the head-mounted frame 370 blocks ambient light from reaching the front face of the PED 300, which prevents the ambient light sensor 132 from detecting light and or shadows. The head-mounted frame 370 is in physical contact with the front face of the PED 300, which indicates to the proximity sensor 134 that an object (e.g., the user's head) is near throughout the time that the PED 300 is within the head-mounted frame 370.

FIG. 4A illustrates a head-mounted display system according to embodiments of the present disclosure. FIG. 4A shows the PED 300 being received into to a slot of a head-mounted frame 470 including a light turning element 480 according to embodiments of the present disclosure. The embodiment of the head-mounted display system shown in FIG. 4A is for illustration only. Other embodiments could be used without departing from the scope of the present disclosure.

The head-mounted frame 470 includes a front slot configured to receive the PED 300. The PED 300 slides into the slot and couples to the head-mounted frame 470, forming a head-mounted display (HMD) shown in FIG. 4B. The user inserts the PED 300 into the head-mounted frame 470 so that the group 320 of sensors is on the same side of the head-mounted frame 470 as the light turning element 480. The dimensions and shape of the slot is configured to fit the exact dimensions and shape of the PED 300. The interior of the slot includes a compressible material that presses (in a posterior direction) the front face of the PED 300 flush against the interior rear surface of the slot (closest to the lenses of the head-mounted frame), blocking ambient light from reaching the image display 310 of the PED 300. Ambient light on the image display 310 could degrade the user's view of the image display. In certain embodiments, the front slot of includes a back via allowing a back camera disposed on the back of the PED (i.e., the opposite side as the image display 410) to capture images of the environment outside the head-mounted frame 470 without the back camera's field of view being blocked by the head-mounted frame 470.

The head-mounted frame 470 includes a pair of lenses 475. The user's eyes look through the lenses 475 to the image display 310. The head-mounted frame 470 holds the PED in front of the user's eyes for near-eye viewing.

The light turning element 480 is on the same side of the head-mounted frame 470 as the group 320 of sensors, but from the solid top and rear points of view of the head-mounted frame 470 shown in FIG. 4A, the light turning element 480 is hidden from view, disposed beneath the top and in front of the rear surfaces.

FIG. 4B illustrates a sensor's field of view free from obstruction and turned away from the user's head by a light turning element within the head-mounted display system of FIG. 4A. FIG. 4B shows a top view of a head-mounted display worn by a user. The example of the sensor's field of view 425 shown in FIG. 4B is for illustration only. Other examples could be used without departing from the scope of the present disclosure.

The front slot of the head-mounted frame 470 includes a cutout that exposes the group 320 of sensors to a closed hollow channel 472 within the frame 470. When the PED 300 is coupled to the frame 470 within the slot, the cutout aligns with the group 320 of sensors. For example, the cutout frames or traces the outer perimeter of a compact area of the front-face of the PED 300 where the group 320 of sensors is disposed. The dimensions of the cutout are at least large enough to not block the field of view of any sensors in the group 320 of sensors. The cutout dimensions can be smaller than the dimensions of the channel 472. In certain embodiments, the head-mounted frame 470 encases the PED 300 within the slot.

The channel 472 is an empty space within the body of the head-mounted frame 470. That is, the channel 472 cannot be seen from a top, rear, or bottom view of the head-mounted frame 470. The closed channel 472 includes at least two vias (for example, openings or holes) through which the sensors 130-138 send and receive signals or information. The two vias include an entry via (such as the cutout of the slot) and an exit via. In the example shown, signals emitted from IR sensor 136 enter the channel 472 through the entry via at the front of the channel 472 closest to the sensors 130-138 and exit the channel 472 through the exit via at the side of the head-mounted frame 470. That is, the side of the head-mounted frame 470 includes a cutout dimensioned large enough permit the emitted signals to exit without interference from the body of the frame 470. In the example shown, the channel 472 shape is triangular. The hypotenuse of the triangular channel 472 is disposed at an acute angle (e.g., 45°) toward the front and side of the head-mounted frame 470. The vias are small, and do not permit user's hand or fingers to enter the channel 472.

The head-mounted display system includes one or more a light turning elements 480. As shown, a light turning element 480 is disposed on the hypotenuse surface of the triangular channel 472. The light turning element 480, such as mirror or prism, is incorporated into the head-mounted frame 470 that is designed to encase PED 300 for an immersive Virtual Reality or Augmented Reality (VR/AR) experience. The light turning element 480 is positioned to redirect signals emitted by signal emitters (e.g., sensor 136) embedded on the PED 300 through an opening towards the open space outside of the HMD, where it is convenient for the user to make gestures, etc. Along the same optical path but in a different direction (e.g., an opposite direction or orthogonal direction), the light turning element 480 redirects user input (such as hand motions within the redirected field of view of the sensors) back to signal receivers (e.g., sensor 136) in the PED 300. That is, the user's hand motions occur outside the body of the head mounted frame 470. In certain embodiments, the light turning element 480 modifies the field of view of the sensors in the group 320.

Unlike other HMD systems that have mirrors, light guides, Fresnel lenses, reflectors or other similar optical elements incorporated for the purpose of directing the display that is not initially emitted towards the user's eyes, the reflective surface of the light turning element 480 in the present disclosure redirects not only the signal emitted by the HMD element to be delivered to the user, but also helps the sensors 130-138 detect user input.

Unlike other light turning elements for redirecting sensor signals, sensors 130-138 in this disclosure arrangement are part of an embedded in the PED 300 separate from the light turning element 480. The light turning element 480 is not part of the PED device. The sensors 130-138, as they are when not combined with or used with the light turning element 480 in the head-mounted frame 470 arrangement, carry out the function intended for them by PED 300 in normal handheld mode. That is, the HMD system of the present disclosure does not modify the way the sensors are installed or embedded in the PED 300 and does not modify the way the sensors 130-138 are used in the PED 300 in handheld mode.

The light turning element 480 is of such size, shape, and disposition that it can reflect the entire field of view of a sensor aligned with the light turning element 480. This proper size, shape, and aligned disposition ensures that the sensor's field of view is not partially blocked, which would lead to false inputs. The characteristics of the light turning element 480 may also depend on the PED 300 parameters and specific design features of the head-mounted frame 470.

A single light turning element can be used for multiple sensors, or each sensor could be corresponded to a separate reflective surface. In certain embodiments, the light turning element 480 includes a reflective surface that redirects the fields of view of the sensors in the group 320. In certain embodiments, the light turning element 480 includes a first reflective surface that redirects or modifies a first sensor's (e.g., light sensor's 132) field of view to have certain characteristics when aligned with that sensor (e.g., the light sensor 132), additionally the light turning element 480 includes a second reflective surface that aligns with a second sensor (e.g., proximity sensor 134) to differently redirect or modify the second sensor's (e.g., the proximity sensor's 134) field of view to have certain characteristics that are different from the characteristics of the first redirected/modified field of view. In certain embodiments, the first reflective surface of the light turning element 480 redirects the first sensor's field of view in a different direction (e.g., up above or down below the head mounted frame 470) than the redirection of the sensor's field of view (e.g., to the right or left side of the head mounted frame 470). In embodiments where sensors' fields of view are directed to different sides of the head mounted frame 470, the channel 472 includes an exit via on each of the different sides, and as a result, the head-mounted frame 470 includes a corresponding cutout on each of the different sides.

The optical properties of the light turning element 480 are suitable for the target sensor to be aligned with the light turning element. For example, a mirror can have coatings to make sure to have the most reflectivity for each target sensor in the required wavelengths. Different coatings could include silver, gold, or dielectric. In certain embodiments, the light turning element 480 can redirect one type of signal but not another type of signal, so that the light turning element 480 selectively enables use of sensors.

Application of the optical properties of the light turning element 480 is not limited to sensors. For example, LED or field of view of a front-facing camera of a smartphone could be redirected by a light turning element aligned with the LED indicator. Then the signals indicated by LED lights can be visible outside the HMD even when the LED itself is not visible. The front camera which is blocked when encased in a head-mounted frame 470 would be able to capture reflected scenes which can be analyzed to recognize features of the image, etc.

Figure 4C:
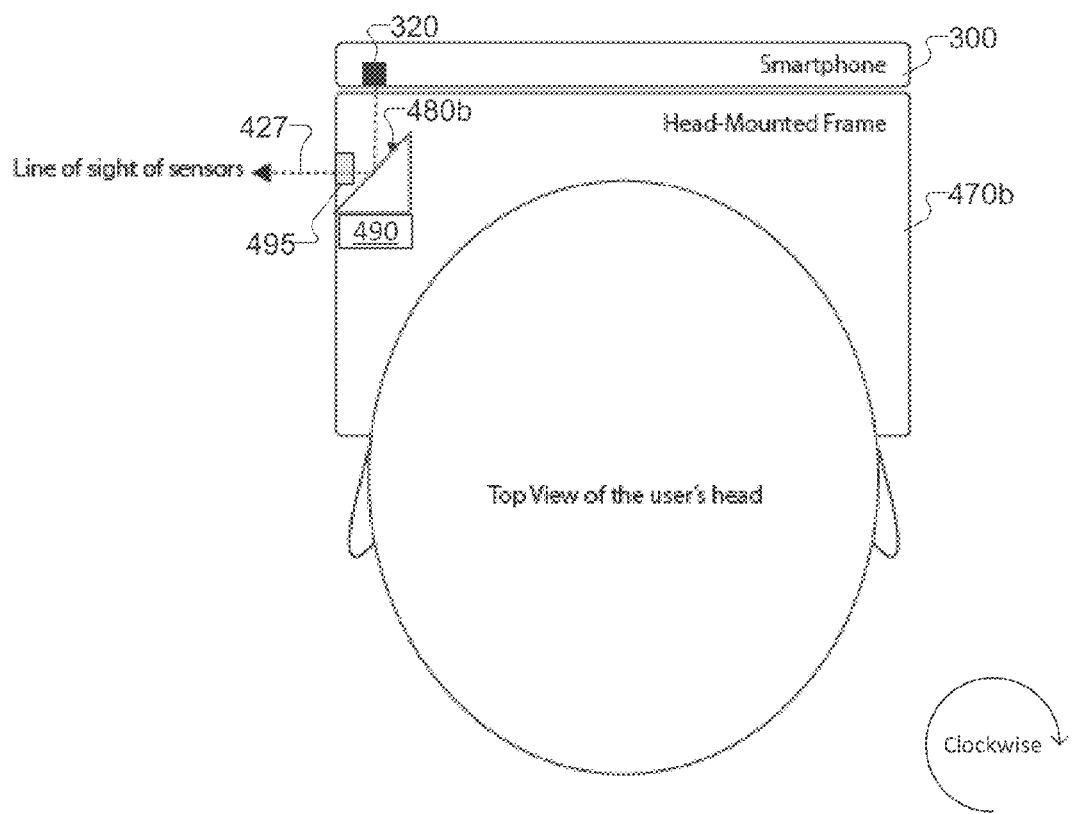
FIG. 4C illustrates an example of a sensor's line of sight directed away from the user's head by the light turning element within the head-mounted frame of FIG. 4A.

FIG. 4C illustrates an example of a sensor's line of sight directed away from the user's head by the light turning element within the head-mounted frame of FIG. 4A. The embodiment of the sensor's line of sight 427 shown in FIG. 4C is for illustration only. Other embodiments could be used without departing from the scope of the present disclosure.

The head-mounted frame 470b includes a servo mechanism 490 that translates or rotates the light turning element 480b to adjust the position and angle of the light turning element 480b. In certain embodiments, the head-mounted frame 470b includes a light turning element designed to be coupled to a PED's sensors 320, but when the PED 300 is encased in the head-mounted frame, the sensors 320 are positioned so that the light turning element cannot reflect signals from all the multiple sensors due to its size or angle. In such situation, the position and angle of the light turning element 480 could be manually adjusted or automatically adjusted by the servo mechanism 490 to align with one sensor or another or to align with a selective group of sensors at different times. That is, at one time, the servo mechanism 490 adjusts the position and angle of the light turning element to be within the line of sight for a first sub-group of sensors selected from the group 320 of sensors; and at another time, the servo mechanism 490 adjusts the position and angle of the light turning element to be within the line of sight for a second, different sub-group of sensors selected from the group 320 of sensors.

The head-mounted frame 470 can include a cover mechanism 495 that closes to obstruct the light turning element 480 to optimize viewing conditions of the image display 310 and opens to reveal the field of view of the group 320 of sensors when in use. In certain embodiments, the cover mechanism 495 includes a translucent or colored glass or plastic panel that hides or fills the opening of the exit via and hides the light turning element 480 from outside view while letting through the intended type of signal. In certain embodiments, the cover mechanism 495 fills the exit via in an aesthetically pleasing manner and hides the light turning element 480 from the user's view. An aesthetically pleasing cover mechanism 495 can include a panel flush with the outer surface of the head-mounted frame 470.

The PED 300 includes user interface (UI) logic designed specifically for a HMD operation mode when the PED 300 is encased in the head-mounted frame 470 forming a HMD. This UI logic utilizes the user inputs detected within the redirected field of view of the sensors to provide interactivity to the HMD system (i.e., comprising the PED 300 and the head-mounted frame 470). Although the PED 300 includes the UI logic for the HMD operation mode according to the present disclosure, the PED 300 is a separate device from the head-mounted frame 470 device and includes a handheld mode (e.g., phone mode, PDA mode). The sensors embedded in the PED 300 become part of the user interface logic in ways that the sensors are not used for in the normal handheld mode.

The PED 300 to be encased in the head-mounted frame 470 with the above-described reflective surface includes the UI logic to utilize the HMD enabled input modes according to the present disclosure. The implementation of UI logic for the HMD operation mode on the PED 300 can be at the platform level or at an installable application level, or combination of both. As a non-limiting example, UI logic for the HMD operation mode can directly modify Android operating system (OS) of a SAMSUNG GALAXY S4 PED. Code for the UI logic for the HMD operation mode could also be removed and packaged into an application so that it is downloadable and installable. The code could be such that it adds a HMD operation mode interface to the platform when it is installed on a PED. The HMD operation mode interface includes a system to detect when the PED is encased in the head-mounted frame 470 and configure the interface mode of the device appropriately.

In certain embodiments, the implementation of UI logic for the HMD operation mode on the PED 300 could be specific and limited to an application. In this way, specific interface systems can be designed and implemented by individual application developers using application programming interface (API) provided by the platform to allow the developers to use the access to new mode of detection in an advantageously useful way for the application's purposes.

FIGS. 5A and 5B illustrate an example of a user wearing a HMD implementing UI logic for the HMD operation mode and using touch-free gestures to input a user-selection according to embodiments of the present disclosure. For illustration only, in FIGS. 5A and 5B, the implementation of UI logic for the HMD operation mode enables a user to use touch-free gestures to both point to image based content using an unclicked cursor and to click on a user-selected portion of the image based content indicating a selection. Other embodiments could be used without departing from the scope of the present disclosure.

In FIGS. 5A and 5B, the HMD 500 includes a PED (such as PED 100, 200, or 300) and a head-mounted frame (such as frame 370, 470, or 470b) according to embodiments of the present disclosure. The user wears the HMD 500 by placing the HMD 500 on the user's head 510. The PED's image display (such as 110, 210, or 310) displays the HMD screen 501. The HMD screen 501 includes a screen for each eye on bifurcated portions (e.g., halves) of the PED's image display. The left screen 515 includes an image configured to be viewed by the user's left eye, while the right screen 520 includes an image configured to be viewed by the user's right eye. The HMD provides binocular view, such that the left screen 515 displays a slightly different from the right screen 520.

As shown in FIGS. 5A and 5B, the implementation of UI logic for the HMD operation mode enables the user to click on image based content without touching the PED 300. The user indicates a user selection by clicking a cursor on image based content displayed in the HMD screen 501. The HMD screen 501 displays a cursor, referred to by reference numbers 525a and 525b with respect to FIG. 5A and by reference numbers 525c and 525d with respect to FIG. 5B. As a result of the binocular view, the location the cursor 525a appears in the left screen 515 is slightly different from the location the cursor 525b appears in the right screen 520.

FIG. 5A illustrates an example of a head-mounted display and screen in an unclicked state according to embodiments of the present disclosure. The embodiment of the head-mounted display 500 and screen 501 in an unclicked state shown in FIG. 5A is for illustration only. Other embodiments could be used without departing from the scope of the present disclosure.

In the HMD screen 501, the cursor 525a-b is a lightly shaded solid circle, indicating that the PED is in an unclicked state in which no image content is selected. Other embodiments can display the unclicked-cursor another shape, color, pattern, or hatching.

The user's hands are not shown in FIG. 5A, indicating that the user's hands are not in the field of view of the group of sensors (such as 320) within the HMD 500. In certain embodiments, when the PED is in the HMD operation mode, the PED (for example, using the group 320 of sensors) enters an unclicked state when the PED does not detect at least one of the following: an object in close proximity to the exit via 505; a shadow covering the exit via 505; or a closure of the exit via (such as by the cover mechanism 495). For example, the proximity sensor 134 emits an electromagnetic field or a beam of electromagnetic radiation through the entry via toward the light turning element 480, 480b that redirects the field of view 425 (for example centered about the line of sight 427) through the exit via 505; and in response to not detecting a blockage in the field of view 425, the proximity sensor 134 sends a signal to the controller 140 indicating no click.

Figure 6:
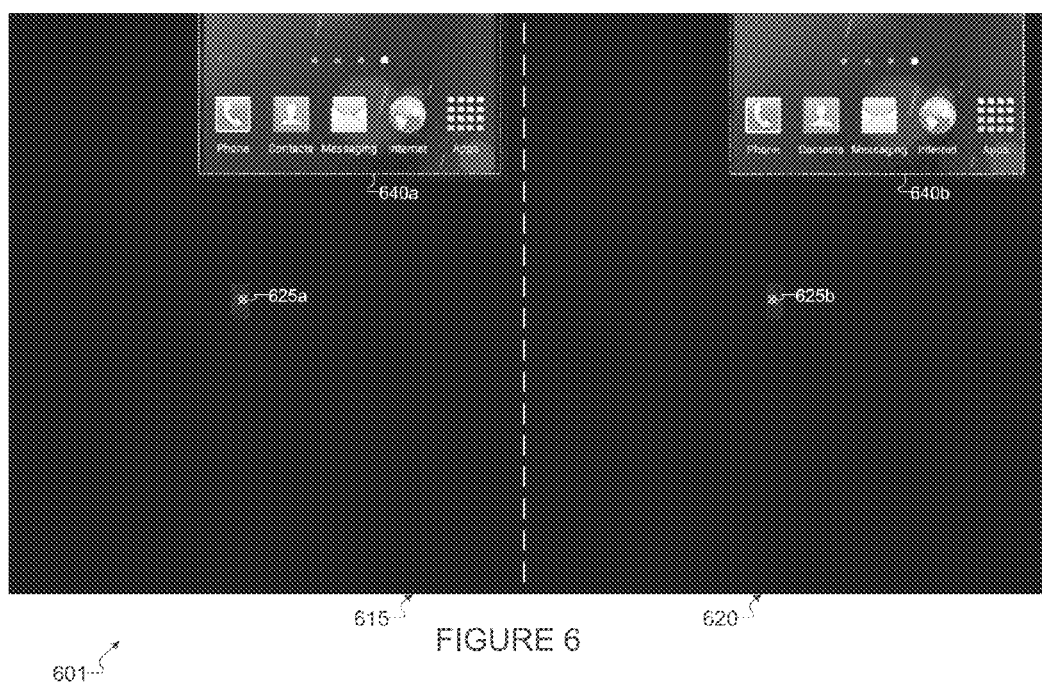
FIG. 6 illustrates an example of a head-mounted display screen in an unclicked state according to embodiments of the present disclosure.

While in the unclicked state, movement of the HMD 500 can cause the image display (such as 110, 210, or 310) to scroll in a direction corresponding to the direction of the movement of the HMD 500. In the embodiment shown in FIGS. 5A and 5B, the implementation of UI logic for the HMD operation mode provides a moveable cursor and a stationary display. As a non-limiting example of a moveable cursor and a stationary image content, the PED can cause the cursor to automatically move in a direction corresponding to the direction that the user's head 510 tilts and/or the direction that the user's head rotates. As the cursor moves across the stationary image content, the cursor points to different portions of the displayed image content that would be affected by a click action. In other embodiments (as shown in FIG. 6 and described more particularly below), the implementation of UI logic for the HMD operation mode provides a stationary cursor and an automatic scrolling or automatically panning display.

In FIG. 5A, the HMD screen 501 shows an array of photographs including two rows and three columns. The cursor 525a-b is disposed near the upper right-hand corner of the photograph 535a in the top row and center column but not on any of the photographs.

During transition from FIG. 5A to FIG. 5B, while the HMD 500 is in the unclicked state, the user's movement causes the cursor 525a-b to hover over the photograph 535a, and then the user inserts the user's hand within the field of view of the group of sensors and in close proximity to the exit via 505.

FIG. 5B illustrates an example of a head-mounted display and screen in a clicked state according to embodiments of the present disclosure. The embodiment of the head-mounted display screen in a clicked state shown in FIG. 5B is for illustration only. Other embodiments could be used without departing from the scope of the present disclosure.

The cursor 525c-d has a different color pattern than the cursor 525a-b, indicating that the PED is in a clicked state in which a portion of the image content is user-selected. In the HMD 501 screen, the clicked cursor 525c-d is a small black solid circle encircled by two concentric rings, including an intermediate ring that is solid white and an outer ring that is solid black. Other embodiments can display the unclicked-cursor another shape or color pattern.

As shown, the PED has entered the clicked state. In certain embodiments, when the PED is in the HMD operation mode, the HMD 500 (for example, using the group 320 of sensors) enters a clicked state when the PED detects at least one of the following: an object or hand 530 in close proximity to the exit via 505; a shadow covering the exit via 505; or a closure of the exit via (such as by the cover mechanism 495). For example, the object or hand 530 disposed within the proximity sensor's 134 redirected field of view 425 reflects a portion of the electromagnetic radiation or blocks a portion of the electromagnetic field back through the exit via 505 toward the light turning element 480, 480b that redirects reflected-radiation/field-blockage through the entry via into the proximity sensor 134; and in response to detecting the reflections/blockage in the field of view 425, the proximity sensor 134 sends a signal to the controller 140 indicating the reflections/blockage. The controller 140 processes the reflections/blockage as an equivalent of a touch-down on the touch panel 161. That is, the proximity sensor's 134 signal to the controller 140 indicating the reflections/blockage can indicate an equivalent of a touch-down-and-hold (for click-drag) or can indicate an equivalent of a number of clicks (e.g., single or double).

In FIG. 5B, the exit via 505 or the cover mechanism 495 is hidden from view and blocked by an object, namely, the user's hand 530. The user's hand 530 is shown, indicating that the user's hand 530 is disposed within the field of view of the HMD's 500 group of sensors (such as 320). The user's hand 530 is in close proximity to the side of the HMD 500 where the exit via 505 is located. The user may position the hand 530 in close proximity to the exit via 505 while touching the HMD 500 and not blocking the exit via 505. The user may cast a shadow covering the exit via 505 by hovering the hand 530 in close proximity to the exit via 505 and within the field of view of the HMD's 500 group of sensors, but without touching the HMD 500. The user may close the exit via 505 by touching and blocking the exit via 505 with the hand 530. The user may close the exit via 505 by inserting the cover mechanism 495 into the exit via 505.

In FIG. 5B, the HMD screen 501 shows the array of photographs including two rows and three columns. The cursor 525c-d is disposed on the photograph 535b in the top row and center column, near the lower right-hand corner of that photograph 535b, indicating that the user has clicked the photograph 535b as the user's selection. The HMD screen 501 includes further features that distinguish the clicked user-selected photograph 535b from the five remaining unclicked non-selected photographs: the clicked user-selected photograph 535b has larger dimensions than the unclicked photographs' dimensions; the truncated caption ("Plano Road C . . . ") of the clicked user-selected photograph 535b has bolder typeface font than the unclicked photographs' truncated captions; and the HMD screen 501 page header includes the un-truncated caption ("Plano Road Climb") of the clicked user-selected photograph 535b.

While in the clicked state, the user may remove the hand 530 from the field of view 425 of the HMD's sensors, which causes the HMD 500 to return to the unclicked state. For example, when the user removes the hand 530 away from in front of the light turning element 480, clearing the redirected field of view of the proximity sensor 134, the controller 140 processes the end of reflections/blockage as an equivalent of a touch-up (i.e., removal of touch) from the touch panel 161. The cursor 525c-d returns to the unclicked state, shown in FIG. 5A as cursor 525a-b.

FIG. 6 illustrates an example of a head-mounted display screen in an unclicked state according to embodiments of the present disclosure. The embodiment of the head-mounted display screen 601 in an unclicked state shown in FIG. 6 is for illustration only. Other embodiments could be used without departing from the scope of the present disclosure.

In the embodiment shown in FIG. 6, the implementation of UI logic for the HMD operation mode provides a stationary cursor 625a-b and an automatic scrolling or automatically panning display. As a non-limiting example, the stationary cursor 625a-b is fixed at the center of the left and right screens 615 and 620. The PED can cause image content to automatically scroll up when the user's head 610 tilts back to look up or can scroll right when the user's head 610 turns clockwise (with reference from an overhead point of view, as shown in FIG. 4C). The PED can cause the image content to automatically scroll down or right when the user's head tilts forward or rotates counterclockwise, respectively. In this case, the PED can cause image content to automatically pan diagonally based on the combination of directions that the user's head 610 tilts and rotates (for example, panning up and right when the user's head 610 tilts up and rotates clockwise). As the movable image content moves under the stationary cursor, the cursor points to different portions of the displayed image content that would be affected by a click action. More particularly, as the movable image content moves under the stationary cursor, the stationary cursor can include the shape and color pattern of the unclicked cursor 525a-b. In response to a click action while the image content is under the stationary cursor, the stationary cursor can include the shape and color pattern of the clicked cursor 525c-d. As shown, the user's movement has caused the image content to pan up and right so much so that the second, third, and fourth quadrants of the left and right screens 615 and 620 are empty of image content, and only the first quadrant (i.e., the upper right-hand quadrant) includes image content, namely, the bottom portion of the image content. No image content is disposed under the cursor 625a-b. In the example shown, the image content has moved such that nothing would be selected in response to a click action. The stationary cursor 625a-b is a bright red (dimly shaded) square (different from the shape and color pattern of the clicked cursor 525c-d and unclicked cursor 525a-b), indicating that no image content is selectable and that the cursor 625*a-b* is not hovering over any of the launcher view 640*a-b*. The launcher view 640*a-b* includes the image content with which the user interacts.

The embodiments the present disclosure are not limited to the HMD implementing UI logic for the HMD operation mode and using a proximity sensor to detect a click action touch-free gesture as input of a user-selection. Other sensors in the PED, alone or in collaboratively, can detect touch-free gestures and send signals to the controller 140 indicating other types of actions.

In certain embodiments, while the user is watching a movie on the HMD 500, the implementation of UI logic for the HMD operation mode on the PED 300 enables the user to select to see what is physically around him by placing his hand 530 in the redirected field of view 425 of the proximity sensor 134. In response to receiving a signal from the proximity sensor 134 indicating the reflections/blockage in the redirected field of view 425, the controller 140 can cause the screen 501 to display a back camera view (for example, while pausing the movie). The back camera captures images or video of the environment physically around the user, allowing the user to see his or her surroundings without removing the HMD 500 from the user's head 510 or otherwise ceasing to look through the lenses 475. Removing the user's hand from the redirected field of view 425 of the proximity sensor 134 can cause the PED to resume playing the movie on the HMD screen 501.

In certain embodiments, the implementation of UI logic for the HMD operation mode on the PED 300 uses a carousel-style design that enables the user to scroll through options in a carousel UI using touch-free gestures. For example, the user's hand can move in a linear path across the redirected field of view 425 of the group of sensors. One or more of the sensors, such as the proximity sensor 134 or the camera 138 can detect the linear motion and transmit a signal to the controller 140 indicating a user-selection to scroll in a direction corresponding to the direction of the linear motion of the user's hand.

Although the present disclosure has been described with embodiments, various changes and modifications may be suggested to one skilled in the art. It is intended that the present disclosure encompass such changes and modifications as fall within the scope of the appended claims.

What is claimed is:

1. A head-mounted display (HMD) system comprising:
   a head-mounted frame comprising a front surface and two lateral surfaces and configured to receive and encase a portable electronic device (PED) that includes a touch-less sensor, the frame includes:
     a front slot configured to hold the PED and maintain contact with a display face of the PED,
     an entry via positioned and dimensioned to prevent blockage of a field of view of the touch-less sensor, and
     a light turning element positioned to redirect the sensor's field of view through an exit via in one of the two lateral surfaces of the head-mounted frame and into open space outside of the head-mounted frame; and
   the PED including:
     the sensor disposed on the display face of the PED and configured to detect a touch-less gesture,
     an image display configured to display image content on the display face of the PED, and
     processing circuitry configured to change modes from a handheld mode to a head-mounted display (HMD) operation mode based on a determination that the PED is encased by the frame and to select the image content based on input signals received from the sensor and the mode.

2. The HMD system of claim 1, wherein the frame is configured to slidably receive the PED in the front slot.

3. The HMD system of claim 1, wherein the frame is configured to block ambient light from the display face of the PED and permit ambient light within the field of view of the sensor.

4. The HMD system of claim 1, wherein the exit via includes a protective cover through which light in the redirected field of view passes.

5. The HMD system of claim 1, wherein the light turning element includes:
   a first reflective surface configured to reflect a first type of light, and
   a second reflective surface configured to redirect a second type of light.

6. The HMD system of claim 1, wherein the light turning element includes at least one of an optical prism and a mirror, and
   wherein the light turning element is configured to reflect signals emitted by the sensor through the exit via to the open space outside of the head-mounted frame.

7. The HMD system of claim 6, wherein the sensor is a proximity sensor configured to emit electromagnetic radiation and in response to receiving return electromagnetic radiation reflected off an object in a field of view of the proximity sensor, transmit an input signal to the processing circuitry indicating a user selection; and
   wherein the light turning element further configured to:
     in response to the emitted electromagnetic radiation falling incident upon the object, receive a portion of the electromagnetic radiation reflected by the object, through the exit via, and
     orthogonally reflect the portion of the reflected electromagnetic radiation through the entry via to the proximity sensor.

8. A head-mounted display (HMD) system comprising:
   a head-mounted frame configured to receive and encase a portable electronic device (PED) that includes a touch-less sensor, the frame includes:
     a front slot configured to hold the PED and maintain contact with a display face of the PED,
     an entry via dimensioned to prevent blockage of a field of view of the touch-less sensor, and
     a light turning element positioned to redirect the sensor's field of view through an exit via in the head-mounted frame and into an open space outside of the head-mounted frame; and
   the PED including:
     the sensor configured to detect a touch-less gesture,
     an image display configured to display image content on a front display face of the PED, and
     processing circuitry configured to change modes from a handheld mode to a head-mounted display (HMD) operation mode based on a determination that the PED is encased by the frame and to select the image content based on input signals received from the sensor and the mode, and wherein:
   the sensor comprises first and second non-touch sensors, each configured to detect a touch-less gesture;
   the light turning element comprises:
     a first light turning element positioned to redirect the first sensor's field of view through a first exit via to the open space outside a first side of the frame, and a second light turning element positioned to redirect a second sensor's field of view through a second exit via to an open space outside another side of the frame; and the head mount frame further comprises the second exit via on a different side of the head-mounted frame than the first exit via.

9. An apparatus comprising:

a head-mounted frame comprising a front surface and two lateral surfaces and configured to receive a portable electronic device (PED) that includes a touch-less sensor, the frame includes:

a front slot configured to hold the PED and maintain contact with a display face of the PED;

an entry via dimensioned to prevent blockage of a field of view of the touch-less sensor;

a light turning element positioned to redirect the sensor's field of view through an exit via in one of the two lateral surfaces of the head-mounted frame and into open space outside of the head-mounted frame; and a servo mechanism coupled to the light turning element and configured to adjust a position or angle of the light turning element to align the exit with a different sensor from a plurality of sensors including the touch-less sensor.

10. The apparatus of claim 9, wherein the frame is configured to slidably receive the PED in the front slot.

11. The apparatus of claim 9, wherein the frame is configured to block ambient light from the display face of the PED and permit ambient light within the field of view of the sensor.

12. The apparatus of claim 9, wherein the exit via includes a protective cover through which light in the redirected field of view passes.

13. The apparatus of claim 9, wherein the light turning element includes:

a first reflective surface configured to reflect a first type of light, and a second reflective surface configured to redirect a second type of light.

14. The apparatus of claim 9, wherein the light turning element includes at least one of an optical prism and a mirror, and wherein the light turning element is configured to reflect signals emitted by the sensor through the exit via to the open space outside of the head-mounted frame.

15. The apparatus of claim 14, wherein the light turning element further configured to:

in response to electromagnetic radiation emitted by the sensor falling incident upon an object in the sensor's redirected field of view, receive a portion of the electromagnetic radiation reflected by the object, through the exit via, and orthogonally reflect the portion of the reflected electromagnetic radiation through the entry via to a proximity sensor as return electromagnetic radiation.

16. An apparatus comprising:

a head-mounted frame configured to receive a portable electronic device (PED) that includes a touch-less sensor, the frame includes:

a front slot configured to hold the PED and maintain contact with a display face of the PED;

an entry via dimensioned to prevent blockage of a field of view of the touch-less sensor; and a light turning element positioned to redirect the sensor's field of view through an exit via in the head-mounted frame and into an open space outside of the head-mounted frame, wherein:

the sensor comprises first and second non-touch sensors;

the light turning element comprises:

a first light turning element positioned to redirect the first sensor's field of view through a first exit via to the open space outside a first side of the frame, and a second light turning element positioned to redirect a second sensor's field of view through a second exit via to an open space outside another side of the frame; and the head mount frame further comprises the second exit via on a different side of the head-mounted frame than the first exit via.

17. A non-transitory computer readable medium embodying a computer program, the computer program comprising computer readable program code that, when executed by processing circuitry, causes the processing circuitry to:

in response to determining that a portable electronic device (PED) is encased by a head-mounted frame, change from a handheld mode to a head-mounted display (HMD) operation mode;

receive input signals from a non-touch sensor of the PED, each non-touch sensor configured to output the input signals in response to detecting a non-touch gesture in a field of view of the non-touch sensor, the non-touch gesture indicating a user selection, wherein the gesture indicates a different user selection when the PED is in the handheld mode than when the PED is in the HMD operation mode;

select image content based on the received input signals;

binocularly render the selected image content to left screen and right screen portions of a bifurcated image display;

display a cursor and interactive image content;

determine a direction of motion of the PED;

in response to receiving an input signal from the non-touch sensor indicating that no object is in close proximity to the non-touch sensor, one of:

display the cursor as an unclicked stationary cursor and movement of the interactive image content in a direction corresponding to the direction of motion of the PED with respect to the stationary cursor, or display the interactive image content as stationary and movement of the cursor in a direction corresponding to the direction of motion of the PED with respect to the stationary interactive image content, and display the cursor as an unclicked moveable cursor; and while the cursor points to a portion of the interactive image content, in response to receiving an input signal from the non-touch sensor indicating that an object is in close proximity to the non-touch sensor:

process the input signal as an equivalent of a touch-down on the pointed-to portion of the interactive image content in a hand-held mode, and change the selected image content.

18. The non-transitory computer readable medium of claim 17, wherein the change in the selected image content includes a change of the cursor to a clicked cursor including different appearance than the unclicked stationary cursor and the unclicked moveable cursor, and the pointed-to portion of the interactive image content.

19. The non-transitory computer readable medium of claim 17, the computer readable program code for receiving input signals from the non-touch sensor of the PED in the HMD operation mode further comprises computer readable program code that, when executed by the processing circuitry, causes the processing circuitry to:
   display a video on the image display;
   while displaying the video, in response to receiving an input signal from the sensor indicating that an object in the sensor's field of view is in close proximity to the sensor:
      change the selected image content to include image content captured by a back camera, and
      stop rendering the video.

20. The non-transitory computer readable medium of claim 17, the computer readable program code for receiving input signals from the non-touch sensor of the PED in the HMD operation mode further comprises computer readable program code that, when executed by the processing circuitry, causes the processing circuitry to:
   display the interactive image content as a first portion of a carousel of selectable options;
   while displaying the first portion of the carousel, and when the input signal indicates that the object in close proximity has moved across the sensor's field of view in a direction in a linear motion, the change in the selected image content includes:
      a scroll of intermediate selectable options between the first portion and a second portion select display followed by the second portion of the carousel.

* * * * *